United States Patent
Jang

(10) Patent No.: US 12,118,243 B2
(45) Date of Patent: Oct. 15, 2024

(54) MEMORY SYSTEM IN WHICH A HOST AND A CONTROLLER STORE A COMMAND AND A RESPONSE TO THE COMMAND BY USING A CIRCULAR QUEUE

(71) Applicant: SK hynix Inc., Gyeonggi-do (KR)

(72) Inventor: In Jong Jang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 205 days.

(21) Appl. No.: 17/689,776

(22) Filed: Mar. 8, 2022

(65) Prior Publication Data
US 2023/0074974 A1 Mar. 9, 2023

(30) Foreign Application Priority Data
Sep. 3, 2021 (KR) .......................... 10-2021-0117637

(51) Int. Cl.
*G06F 3/06* (2006.01)
(52) U.S. Cl.
CPC .......... *G06F 3/0659* (2013.01); *G06F 3/0604* (2013.01); *G06F 3/0679* (2013.01)
(58) Field of Classification Search
None
See application file for complete search history.

(56) References Cited

U.S. PATENT DOCUMENTS

| | | | | |
|---|---|---|---|---|
| 5,892,979 | A * | 4/1999 | Shiraki | G06F 5/06 710/52 |
| 2016/0041774 | A1 * | 2/2016 | Sharifie | G06F 3/0685 711/119 |
| 2018/0285073 | A1 * | 10/2018 | Fukuchi | G06F 5/10 |
| 2021/0073158 | A1 * | 3/2021 | Badger | H04L 47/6215 |
| 2021/0374079 | A1 * | 12/2021 | Shin | G06F 13/382 |

FOREIGN PATENT DOCUMENTS

| | | |
|---|---|---|
| KR | 10-1980104 B1 | 8/2019 |
| KR | 10-2020-0074707 A | 6/2020 |
| KR | 10-2020-0108774 A | 9/2020 |

* cited by examiner

*Primary Examiner* — Michelle T Bechtold
*Assistant Examiner* — Marwan Ayash
(74) *Attorney, Agent, or Firm* — IP & T GROUP LLP

(57) ABSTRACT

A memory system may include: a memory device including a plurality of memory cells, and a controller including: an internal reception queue suitable for queueing a command queued in an external transmission queue, the command being externally provided to the controller, and an internal transmission queue suitable for queueing a response to the command, the response being transmitted from the controller and to be queued in an external reception queue, wherein the controller is suitable for controlling the memory device on the basis of the command to generate the response.

20 Claims, 13 Drawing Sheets

FIG. 6

| Address | 100 | 290 | 480 | 670 | 860 | 1050 | | | | 1810 | 400 |
|---|---|---|---|---|---|---|---|---|---|---|---|
| 100 | CMD | CMD | CMD | CMD | CMD | CMD | CMD | CMD | CMD | CMD | |
| 110 | CMD | CMD | CMD | CMD | CMD | CMD | CMD | CMD | CMD | CMD | |
| 120 | CMD | CMD | CMD | CMD | CMD | CMD | CMD | CMD | CMD | CMD | |
| 130 | CMD | CMD | CMD | CMD | CMD | CMD | CMD | CMD | CMD | CMD | |
| 140 | CMD | CMD | CMD | CMD | CMD | CMD | CMD | CMD | CMD | CMD | |
| 150 | CMD | CMD | CMD | CMD | CMD | CMD | tail | CMD | CMD | CMD | |
| · | CMD | CMD | CMD | CMD | CMD | CMD | | CMD | CMD | CMD | |
| · | CMD | CMD | CMD | CMD | CMD | CMD | head | CMD | CMD | CMD | |
| · | CMD | CMD | CMD | CMD | CMD | CMD | CMD | CMD | CMD | CMD | |
| · | CMD | CMD | CMD | CMD | CMD | CMD | CMD | CMD | CMD | CMD | |
| · | CMD | CMD | CMD | CMD | CMD | CMD | CMD | CMD | CMD | CMD | |
| · | CMD | CMD | CMD | CMD | CMD | CMD | CMD | CMD | CMD | CMD | |
| · | CMD | CMD | CMD | CMD | CMD | CMD | CMD | CMD | CMD | CMD | |
| · | CMD | CMD | CMD | CMD | CMD | CMD | CMD | CMD | CMD | CMD | |
| 280 | CMD | CMD | CMD | CMD | CMD | CMD | CMD | CMD | CMD | CMD | |

FIG. 7

| Address | 100 | 290 | 480 | 670 | 860 | 1050 | . . . . | 1810 | |
|---|---|---|---|---|---|---|---|---|---|
| 100 | CMD | CMD | CMD | CMD | CMD | CMD | CMD | CMD | |
| 110 | CMD | CMD | CMD | CMD | CMD | CMD | CMD | CMD | |
| 120 | CMD | CMD | CMD | CMD | CMD | CMD | CMD | CMD | |
| 130 | CMD | CMD | CMD | CMD | CMD | CMD | CMD | CMD | |
| 140 | CMD | CMD | CMD | CMD | CMD E | CMD | CMD | CMD A | |
| 150 | CMD | CMD | CMD | CMD | CMD | CMD | CMD | CMD | |
| . | CMD | CMD | CMD | CMD | CMD | CMD | CMD | CMD | |
| . | CMD | CMD | CMD | CMD D | CMD | CMD | CMD | CMD | |
| . | CMD | CMD | CMD | CMD | CMD | CMD head=tail | CMD B | | |
| . | CMD | CMD | CMD | CMD | CMD | CMD | CMD | CMD | |
| . | CMD | CMD | CMD F | CMD | CMD | CMD | CMD | CMD | |
| . | CMD | CMD | CMD | CMD | CMD | CMD | CMD C | CMD | |
| . | CMD | CMD | CMD | CMD | CMD | CMD | CMD | CMD | |
| 280 | CMD | CMD | CMD | CMD | CMD | CMD | CMD | CMD | |

400

MEMORY SYSTEM IN WHICH A HOST AND A CONTROLLER STORE A COMMAND AND A RESPONSE TO THE COMMAND BY USING A CIRCULAR QUEUE

CROSS-REFERENCE TO RELATED APPLICATION(S)

The present application claims priority under 35 U.S.C. § 119(a) to Korean Patent Application No. 10-2021-0117637, filed on Sep. 3, 2021, the disclosure of which is incorporated herein by reference in its entirety.

BACKGROUND

1. Field

Various embodiments of the present disclosure relate to a memory system and an operating method thereof, and particularly, to a memory system in which a host and a controller store a command and a response to the command by using the same circular queue, and an operating method of the memory system.

2. Description of the Related Art

Recently, a computer environment paradigm has shifted to ubiquitous computing, which enables a computer system to be accessed anytime and everywhere. As a result, the use of portable electronic devices such as mobile phones, digital cameras, notebook computers and the like has increased. Such portable electronic devices typically use or include a memory system that uses or embeds at least one memory device, i.e., a data storage device. The data storage device can be used as a main storage device or an auxiliary storage device of a portable electronic device.

In a computing device, unlike a hard disk, a data storage device implemented as a nonvolatile semiconductor memory device is advantageous in that it has excellent stability and durability because it has no mechanical driving part (e.g., a mechanical arm), and has high data access speed and low power consumption. Examples of such a data storage device include a universal serial bus (USB) memory device, a memory card having various interfaces, and a solid state drive (SSD).

SUMMARY

Various embodiments of the present disclosure are directed to a memory system in which a host and a controller store a command and a response to the command by using the same circular queue and determine whether the command is abnormal, and an operating method of the memory system.

Also, various embodiments of the present disclosure are directed to a memory system in which a host and a controller can easily track a command by using the same circular queue and reduce memory usage, and an operating method of the memory system.

In accordance with an embodiment of the present disclosure, a memory system may include: a memory device including a plurality of memory cells; and a controller including: an internal reception queue suitable for queueing a command queued in an external transmission queue, the command being externally provided to the controller; and an internal transmission queue suitable for queueing a response to the command, the response being transmitted from the controller and to be queued in an external reception queue. The controller may be suitable for controlling the memory device on the basis of the command to generate the response.

In accordance with an embodiment of the present disclosure, an operating method of a memory system, the operating method may include: receiving a command queued in an external transmission queue, the command being externally provided to the memory system; queuing the command in an internal reception queue; transmitting a response to the command, the response to be queued in an external reception queue; and queueing the response to the command in the internal transmission queue.

In accordance with an embodiment of the present disclosure, a data processing system may include: a host including: a first transmission queue suitable for queueing a command transmitted to a controller; and a first reception queue suitable for queueing a response to the command, the response being transmitted from the controller; a memory device including a plurality of memory blocks; and the controller including: a second reception queue suitable for queueing the command received from the host; and a second transmission queue suitable for queueing the response. The controller may be suitable for controlling the memory device on the basis of the command to generate the response.

In accordance with an embodiment of the present disclosure, a system may include: a first circuit configured to sequentially provide items by generating and queueing the items in a first queue; and a second circuit configured to operate in response to the provided items by queueing the provided items in a second queue. The first and second queues may have the same circular queue structure, the same size and the same address scheme. The first and second circuits may be further configured to reset the respective first and second queues when at least one of the first and second queues becomes full of items and contents and/or addresses are different from corresponding items respectively queued in the first and second queues.

BRIEF DESCRIPTION OF THE DRAWINGS

FIG. 6 is a diagram illustrating a circular queue, in accordance with an embodiment of the present disclosure.

FIG. 7 is a diagram illustrating a method of searching for a command area in a circular queue full state, in accordance with an embodiment of the present disclosure.

DETAILED DESCRIPTION

Figure 1:
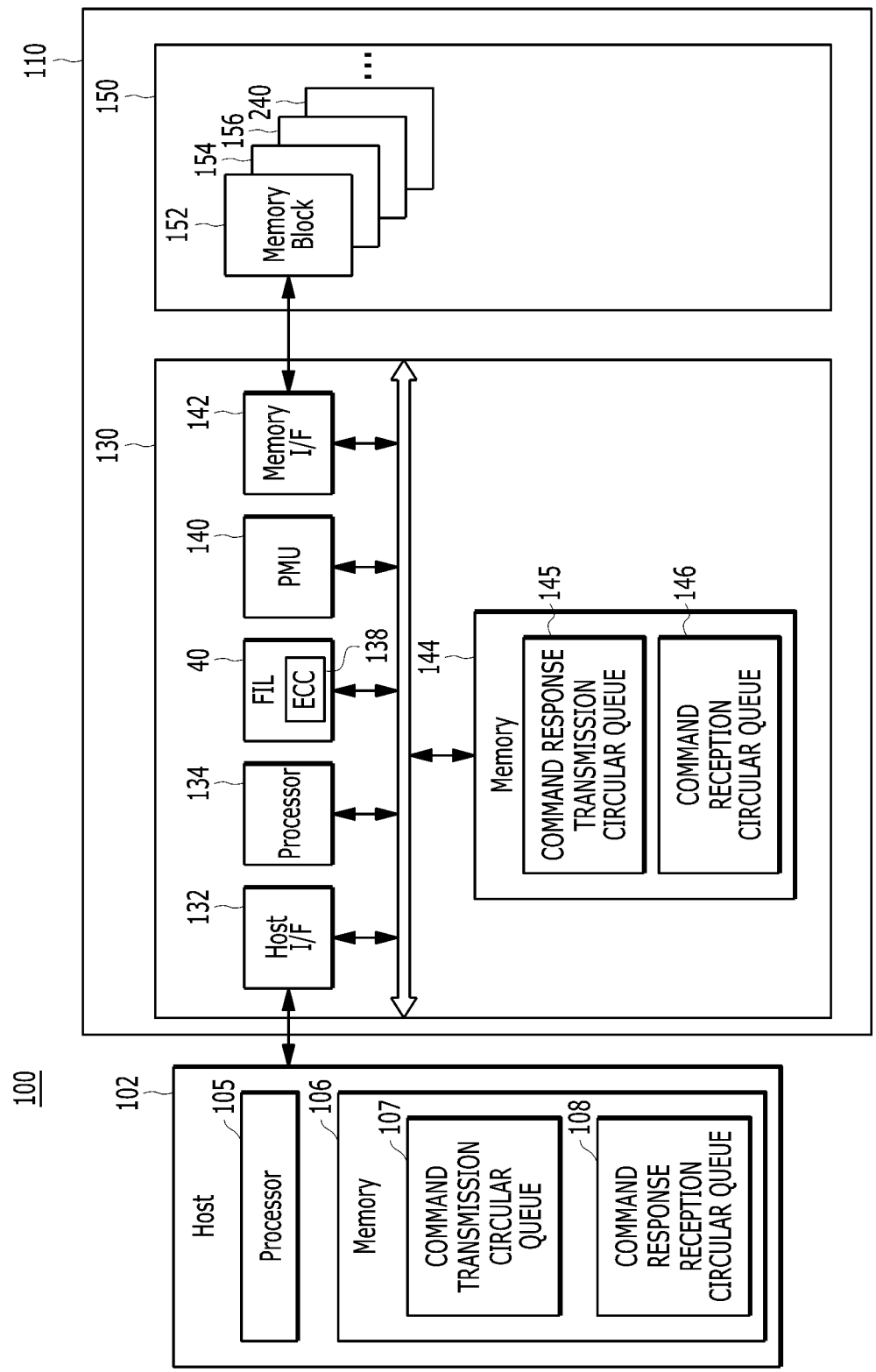
FIG. 1 is a diagram schematically illustrating an example of a data processing system including a memory system, in accordance with an embodiment of the present disclosure.

Various embodiments of the present disclosure are described below with reference to the accompanying drawings. Elements and features of this disclosure, however, may be configured or arranged differently to form other embodiments, which may be variations of any of the disclosed embodiments.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments.

In this disclosure, the terms "comprise," "comprising," "include," and "including" are open-ended. As used in the appended claims, these terms specify the presence of the stated elements and do not preclude the presence or addition of one or more other elements. The terms in a claim do not foreclose the apparatus from including additional components (e.g., an interface unit, circuitry, etc.).

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational (e.g., is not turned on nor activated). The block/unit/circuit/component used with the "configured to" language includes hardware—for example, circuits, memory storing program instructions executable to implement the operation, etc. Additionally, "configured to" can include a generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that implement or perform one or more tasks.

As used in this disclosure, the term 'circuitry' or 'logic' refers to all of the following: (a) hardware-only circuit implementations (such as implementations in only analog and/or digital circuitry) and (b) combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and (c) circuits, such as a microprocessor(s) or a portion of a microprocessor(s), that require software or firmware for operation, even if the software or firmware is not physically present. This definition of 'circuitry' or 'logic' applies to all uses of this term in this application, including in any claims. As a further example, as used in this application, the term "circuitry" or "logic" also covers an implementation of merely a processor (or multiple processors) or a portion of a processor and its (or their) accompanying software and/or firmware. The term "circuitry" or "logic" also covers, for example, and if applicable to a particular claim element, an integrated circuit for a storage device.

As used herein, the terms "first," "second," "third," and so on are used as labels for nouns that the terms precede, and do not imply any type of ordering (e.g., spatial, temporal, logical, etc.). The terms "first" and "second" do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term "based on" is used to describe one or more factors that affect a determination. This term does not foreclose additional factors that may affect a determination. That is, a determination may be solely based on those factors or based, at least in part, on those factors. For example, the phrase "determine A based on B." While in this case, B is a factor that affects the determination of A, such a phrase does not foreclose the determination of A from also being based on C. In other instances, A may be determined based solely on B.

Herein, an item of data, a data item, a data entry or an entry of data may be a sequence of bits. For example, the data item may include the contents of a file, a portion of the file, a page in memory, an object in an object-oriented program, a digital message, a digital scanned image, a part of a video or audio signal, metadata or any other entity which can be represented by a sequence of bits. According to an embodiment, the data item may include a discrete object. According to another embodiment, the data item may include a unit of information within a transmission packet between two different components.

Referring to FIG. 1, the data processing system 100 may include a host 102 engaged or operably coupled with the memory system 110.

The host 102 may include any of a portable electronic device, such as a mobile phone, an MP3 player, a laptop computer, or the like, and an electronic device, such as a desktop computer, a game player, a television (TV), a projector, or the like.

The host 102 also includes at least one operating system (OS), which can generally manage and control, functions and operations performed in the host 102. The OS can provide interoperability between the host 102 engaged with the memory system 110 and the user using the memory system 110. The OS may support functions and operations corresponding to a user's requests. By way of example but not limitation, the OS can be classified into a general operating system and a mobile operating system according to mobility of the host 102. The general operating system may be split into a personal operating system and an enterprise operating system according to system requirements or a user's environment. The personal operating system, including Windows and Chrome, may be subject to support services for general purposes. But the enterprise operating systems can be specialized for securing and supporting high performance, including Windows servers, Linux, Unix, and the like. Further, the mobile operating system may include Android, iOS, Windows mobile, and the like. The mobile operating system may be subject to support services or functions for mobility (e.g., a power saving function). The host 102 may include a plurality of operating systems. The host 102 may execute multiple operating systems interlocked with the memory system 110, corresponding to a user's request. The host 102 may transmit a plurality of commands corresponding to the user's requests into the memory system 110, thereby performing operations corresponding to commands within the memory system 110.

The host 102 may include a processor 105 and a memory 106, and the memory 106 may include a command transmission circular queue 107 and a command response reception circular queue 108.

The processor 105 may allocate some areas of the memory 106 to the command transmission circular queue 107 or the command response reception circular queue 108, transmit a command to the memory system 110, queue the transmitted command in the command transmission circular queue 107, and queue a response to the transmitted command in the command response reception circular queue 108.

The storage devices for the memory system 110 may be implemented with a volatile memory device, for example, a dynamic random access memory (DRAM) and a static RAM (SRAM), and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM), and a flash memory.

The memory system 110 may include a controller 130 and a memory device 150. The memory device 150 may store data to be accessed by the host 102. The controller 130 may control an operation of storing data in the memory device 150.

The controller 130 and the memory device 150 included in the memory system 110 may be integrated into a single semiconductor device, which may be included in any of the various types of memory systems as discussed above in the examples.

By way of example but not limitation, the controller 130 and memory device 150 may be implemented with an SSD. When the memory system 110 is used as an SSD, the operating speed of the host 102 connected to the memory system 110 can be improved more than that of the host 102 implemented with a hard disk. In addition, the controller 130 and the memory device 150 may be integrated into one semiconductor device to form a memory card, such as a PC card (PCMCIA), a compact flash card (CF), a memory card such as a smart media card (SM, SMC), a memory stick, a multimedia card (MMC, RS-MMC, MMCmicro), a secure digital SD card (SD, miniSD, microSD, SDHC), a universal flash memory, or the like.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device and may retain data stored therein even while electrical power is not supplied. The memory device 150 may store data provided by the host 102 through a write operation and provide data stored therein to the host 102 through a read operation. The memory device 150 may include a plurality of memory blocks BLOCK<0, 1, 2, ... >, each of which may include a plurality of pages P<0, 1, 2, 3, 4, ... >. Each of the plurality of pages P<0, 1, 2, 3, 4, ... > may include a plurality of memory cells to which a corresponding word line of a plurality of word lines (WL) is coupled. The memory device 150 also includes a plurality of memory dies 150A, 150B, 150C, and 150D as shown in FIG. 1, each of which includes a plurality of planes. Each of the planes includes some memory blocks among the plurality of memory blocks BLOCK<0, 1, 2, ... >. In addition, the memory device 150 may be a flash memory, and the flash memory may have a three-dimensional stack structure.

A structure of the memory device 150 and a three-dimensional stack structure of the memory device 150 are described in more detail below with reference to FIGS. 3 to 5, and a plurality of planes each including a plurality of memory blocks 152, 154, 156 and 240, a plurality of memory dies each including the plurality of planes and the memory device 150 including the plurality of memory dies are described in more detail below with reference to FIG. 6. Thus, detailed descriptions thereof are omitted herein.

The controller 130 in the memory system 110 may control the memory device 150 in response to a request from the host 102. For example, the controller 130 may provide data read from the memory device 150, to the host 102, and may store data provided from the host 102, in the memory device 150. To this end, the controller 130 may control read, write, program, and erase operations of the memory device 150.

More specifically, the controller 130 includes a host interface (I/F) unit 132, a processor 134, a flash translation layer (FTL) unit 40, a power management unit (PMU) 140, a memory interface (I/F) unit 142 and a memory 144.

The host interface 132 may process commands and data provided by the host 102, and may communicate with the host 102 through at least one of various communication standards or interfaces such as universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI), and integrated drive electronics (IDE). In accordance with an embodiment, the host interface 132 is a component for exchanging data with the host 102, which may be implemented through firmware called a host interface layer (HIL).

The ECC component 138 can correct error bits of the data to be processed in (e.g., outputted from) the memory device 150, which may include an ECC encoder and an ECC decoder. Here, the ECC encoder can perform error correction encoding of data to be programmed in the memory device 150 to generate encoded data into which a parity bit is added and store the encoded data in memory device 150. The ECC decoder can detect and correct errors contained in a data read from the memory device 150 when the controller 130 reads the data stored in the memory device 150. After performing error correction decoding on the data read from the memory device 150, the ECC component 138 can determine whether the error correction decoding has succeeded and output an instruction signal (e.g., a correction success signal or a correction fail signal). The ECC component 138 can use the parity bit which is generated during the ECC encoding process, for correcting the error bit of the read data. When the number of the error bits is greater than or equal to a threshold number of correctable error bits, the ECC component 138 might not correct error bits but instead may output an error correction fail signal indicating failure in correcting the error bits.

The ECC component 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC component 138 may include any and all circuits, modules, systems or devices for performing the error correction operation based on at least one of the above described codes.

The PMU 140 may manage electrical power provided in the controller 130.

The memory interface 142 may serve as an interface for handling commands and data transferred between the controller 130 and the memory device 150, to allow the controller 130 to control the memory device 150 in response to a request delivered from the host 102. The memory interface 142 may generate a control signal for the memory device 150 and may process data entered into or outputted from the memory device 150 under the control of the processor 134 when the memory device 150 is a flash memory and, in particular, when the memory device 150 is a NAND flash memory. The memory interface 142 can provide an interface for handling commands and data between the controller 130 and the memory device 150, for example, operations of NAND flash interface, in particular, operations between the controller 130 and the memory device 150. In accordance with an embodiment, the memory interface 142 can be implemented through firmware called a Flash Interface Layer (FIL) as a component for exchanging data with the memory device 150.

The flash translation layer (hereinafter referred to as the "FTL") unit 40 may control general operations of the memory system 110. That is, the FTL unit 40 may receive a read command, a program command, a read command and logical addresses of data corresponding to the read command and the program command from the host interface unit 132, and include a logical to physical (L2P) map to convert the logical addresses of the received data into physical addresses of the memory device 150. The FTL unit 40 may be firmware driven by the processor 134.

The FTL unit 40 may convert the logical addresses of the data received from the host interface unit 132 into the physical addresses of the memory device 150 corresponding to the logical addresses of the data by using the L2P map, and transmit physical addresses of the data to the memory interface unit 142.

The FTL unit 40 may include an ECC unit 138.

The memory 144 may support operations performed by the memory system 110 and the controller 130. The memory 144 may store temporary or transactional data which occurred or was delivered for operations in the memory system 110 and the controller 130. The controller 130 may control the memory device 150 in response to a request from the host 102. The controller 130 may deliver data read from the memory device 150 into the host 102. The controller 130 may store data entered through the host 102 within the memory device 150. The memory 144 may be used to store data for the controller 130 and the memory device 150 in order to perform operations such as read operations or program/write operations or erase operation.

When the controller 130 controls read, write, program, and erase operations of the memory device 150, data to be transferred or generated between the controller 130 and the memory device 150 in the memory system 110 may be stored in the memory 144. For example, the memory 144 may store data necessary to perform data write and read operations between the host 102 and the memory device 150 and data when performing the data write and read operations. For such data storage, the memory 144 may include a program memory, a data memory, a write buffer/cache, a read buffer/cache, a data buffer/cache, a map buffer/cache, and so forth.

The memory 144 may also include a command response transmission circular queue 145 and a command reception circular queue 146. The command reception circular queue 146 may queue a command received from the host 102, and the command response transmission circular queue 145 may queue a response to a command transmitted to the host 102 by the controller 130 in response to the command received from the host 102.

The processor 134 controls the entire operations of the memory system 110. In particular, the processor 134 controls a program operation or a read operation for the memory device 150, in response to a write request or a read request from the host 102. The processor 134 drives firmware which is referred to as a flash translation layer (FTL), to control general operations of the memory system 110. The processor 134 may be realized by a microprocessor or a central processing unit (CPU).

For instance, the controller 130 performs an operation requested from the host 102, in the memory device 150. That is, the controller 130 performs a command operation corresponding to a command received from the host 102, with the memory device 150, through the processor 134 embodied by a microprocessor or a central processing unit (CPU). The controller 130 may perform a foreground operation as a command operation corresponding to a command received from the host 102. For example, the controller 130 may perform a program operation corresponding to a write command, a read operation corresponding to a read command, an erase operation corresponding to an erase command, or a parameter set operation corresponding to a set parameter command or a set feature command as a set command.

The controller 130 may also perform a background operation for the memory device 150, through the processor 134 embodied by a microprocessor or a central processing unit (CPU). The background operation for the memory device 150 may include an operation of copying data stored in a memory block among the memory blocks 152, 154 and 156 of the memory device 150 to another memory block, for example, a garbage collection (GC) operation. The background operation may include an operation of swapping data between one or more of the memory blocks 152, 154 and 156 of the memory device 150, for example, a wear leveling (WL) operation and a read reclaim (RR) operation. The background operation may include an operation of storing map data retrieved from the controller 130 in the memory blocks 152, 154 and 156 of the memory device 150, for example, a map flush operation. The background operation may include a bad management operation for the memory device 150, which may include checking for and processing a bad block among the plurality of memory blocks 152, 154 and 156 in the memory device 150.

The controller 130 performs a plurality of command operations corresponding to a plurality of commands from the host 102. For example, when performing a plurality of read operations corresponding to plural read commands and a plurality of erase operations corresponding to plural erase commands sequentially, randomly or alternatively, the controller 130 may determine, which channel or way in a plurality of channels (or ways), to use for connecting the controller 130 to a plurality of memory dies in the memory 150 is proper or appropriate for performing each operation. The controller 130 may transmit data or instructions via determined channels or ways for performing each operation. The plurality of memory dies in the memory 150 may transmit an operation result via the same channels or ways, respectively, after each operation is complete. Then, the controller 130 may transmit a response or an acknowledge signal to the host 102. In an embodiment, the controller 130 may check a status of each channel or each way. In response to a command from the host 102, the controller 130 may select at least one channel or way based on the status of each channel or each way so that instructions and/or operation results with data may be delivered via the selected channel(s) or way(s).

By way of example but not limitation, the controller 130 may recognize statuses regarding a plurality of channels (or ways) associated with a plurality of memory dies in the memory device 150. The controller 130 may determine each channel or each way as one of a busy state, a ready state, an active state, an idle state, a normal state, and/or an abnormal state. The determination of the controller 130 may be associated with a physical block address. The controller 130 may refer to descriptors from the memory device 150. The descriptors may include parameters that describe a characteristic of the memory device 150. The descriptors may be data with a set format or structure. For instance, the descriptors may include device descriptors, configuration descriptors, and/or unit descriptors. The controller 130 may refer to, or use, the descriptors to determine which channel(s) or way(s) an instruction or data is exchanged via.

Hereinafter, the memory device 150 included in the memory system 110 according to an embodiment of the present disclosure is described in more detail with reference to FIGS. 2 to 4.

Figure 2:
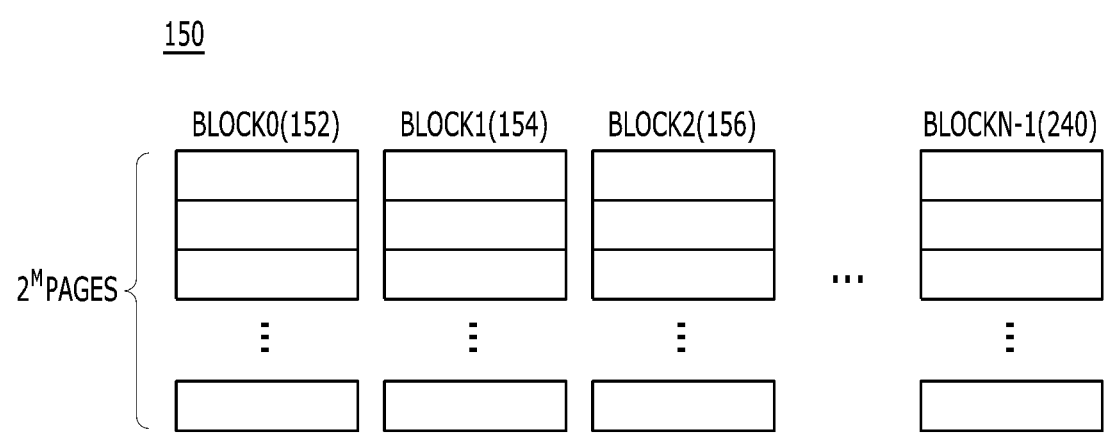
FIG. 2 is a diagram schematically illustrating an example of a memory device, in accordance with an embodiment of the present disclosure.
Figure 3:
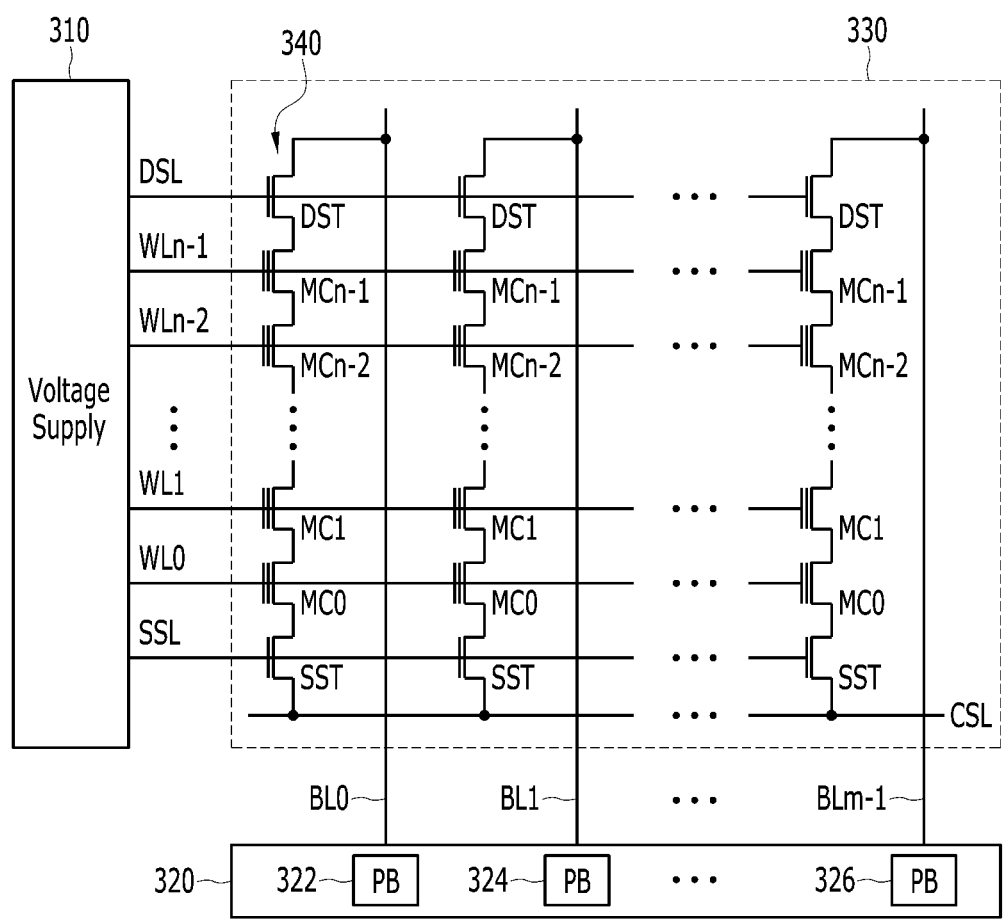
FIG. 3 is a diagram schematically illustrating a cell array circuit of memory blocks in the memory device, in accordance with an embodiment of the present disclosure.
Figure 4:
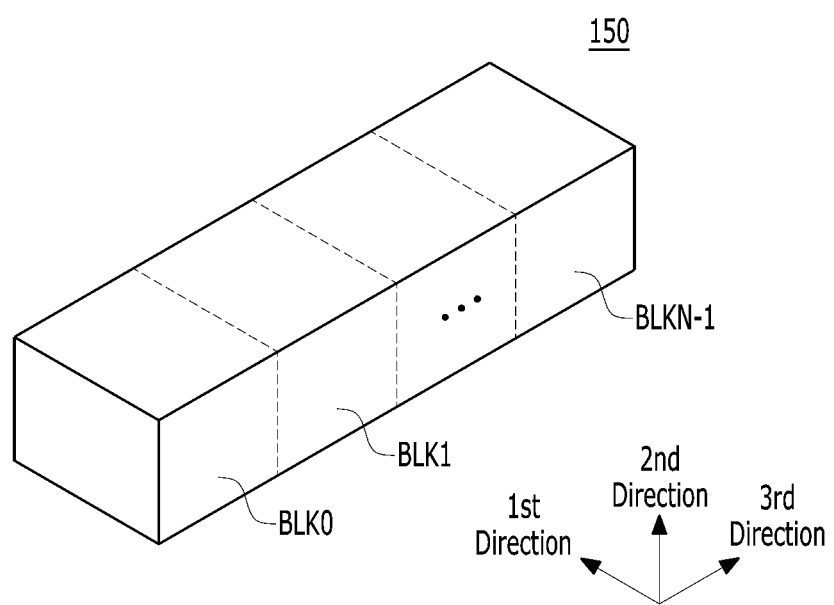
FIG. 4 is a diagram schematically illustrating a memory device structure in the memory system, in accordance with an embodiment of the present disclosure.

FIG. 2 is a diagram schematically illustrating an example of the memory device 150, in accordance with an embodiment of the present disclosure, FIG. 3 is a diagram schematically illustrating a cell array circuit of memory blocks in the memory device 150, in accordance with an embodiment of the present disclosure, and FIG. 4 is a diagram schematically illustrating a memory device structure in the memory system 110, in accordance with an embodiment of the present disclosure when the memory device 150 is implemented as a three-dimensional nonvolatile memory device.

Referring to FIG. 2, the memory device 150 includes a plurality of memory blocks, for example, a block 0 BLOCK0 (152), a block 1 BLOCK1 (154), a block 2 BLOCK2 (156) and a block N−1 BLOCKN−1 (240), and each of the blocks 152, 154, 156 and 240 includes a plurality of pages, for example, $2^M$ pages. For convenience in description, an example is described in which each of the plurality of memory blocks includes the $2^M$ pages, but each of the plurality of memory blocks may include M pages. Each of the pages includes a plurality of memory cells to which a plurality of word lines WL are connected.

The memory device 150 may include a single-level cell (SLC) memory block, a multi-level cell (MLC) memory block, a triple-level cell (TLC) memory block, a quadruple-level cell (QLC) memory block or a multiple-level cell memory block, depending on the number of bits that can store or represent a plurality of memory blocks in one memory cell. The single-level cell (SLC) memory block may include a plurality of pages each implemented by memory cells each capable of storing 1-bit data therein. The multi-level cell (MLC) memory block may include a plurality of pages each implemented by memory cells each capable of storing 2-bit data therein. The triple-level cell (TLC) memory block may include a plurality of pages each implemented by memory cells each capable of storing 3-bit data therein. The quadruple-level cell (QLC) memory block may include a plurality of pages each implemented by memory cells each capable of storing 4-bit data therein. The multiple-level cell memory block may include a plurality of pages each implemented by memory cells each capable of storing 5 or more bits of data therein.

The memory device 150 may store a larger amount of data in the multiple-level cell memory block than in the single-level cell memory block. However, the memory device 150 may process data more rapidly by using the single-level cell memory block than by using the multiple-level cell memory block. That is, the single-level cell memory block and the multiple-level cell memory block have different advantages and disadvantages. Therefore, the processor 134 may control the memory device 150 to program data into the single-level cell memory block when rapid data processing is required. On the other hand, when a large amount of storage space is required, the processor 134 may control the memory device 150 to program data into the multiple-level cell memory block. Consequently, the processor 134 may determine a type of memory blocks in which data is to be stored, according to circumstances.

Hereinafter, for convenience in description, an example is described in which the memory device 150 is implemented as a nonvolatile memory such as a flash memory, for example, a NAND flash memory, but the memory device 150 may be implemented as any of memories such as a phase change random access memory (PCRAM), a resistive random access memory (RRAM or ReRAM), a ferroelectric random access memory (FRAM) and a spin transfer torque magnetic random access memory (SU-RAM or STT-MRAM)).

Each of the memory blocks 210, 220, 230 and 240 stores data provided from the host 102 through a program operation, and provides the host 102 with data stored therein through a read operation.

Referring to FIG. 3, a plurality of memory blocks included in the memory device 150 of the memory system 110 may be implemented as a cell array 330, and include a plurality of cell strings 340 connected to a plurality of bit lines BL0 to BLm−1, respectively. The cell string 340 of each column may include at least one drain selection transistor DST and at least one source selection transistor SST. A plurality of memory cells or memory cell transistors MC0 to MCn−1 may be connected in series between the drain selection transistor DST and the source selection transistor SST. Each of the memory cells MC0 to MCn−1 may be implemented as an MLC that stores data information of a plurality of bits per cell. The cell strings 340 may be electrically connected to the corresponding bit lines BL0 to BLm−1, respectively.

Although FIG. 3 illustrates the cell array 330 composed of NAND flash memory cells as an example, the plurality of memory blocks included in the memory device 150 according to an embodiment are not limited to a NAND flash memory only, and may also be implemented as a NOR-type flash memory, a hybrid flash memory in which at least two types of memory cells are mixed or a one-NAND flash memory in which a controller is embedded in a memory chip.

A voltage supply circuit 310 of the memory device 150 may provide word line voltages (e.g., a program voltage, a read voltage, a pass voltage, etc.) to be supplied to each of word lines, according to an operation mode, and a voltage to be supplied to a bulk (e.g., a well region) in which memory cells are formed. At this time, a voltage generation operation of the voltage supply circuit 310 may be performed under the control of a control circuit (not illustrated). In addition, the voltage supply circuit 310 may generate a plurality of variable read voltages to generate a plurality of read data, and under the control of the control circuit, the voltage supply unit 310 may select one of memory blocks (or sectors) of the cell array, select one of word lines of the selected memory block, and provide each of the selected word lines and each of unselected word lines with the word line voltages.

A read/write circuit 320 of the memory device 150 may be controlled by the control circuit, and operate as a sense amplifier or a write driver according to an operation mode. For example, during a verify/normal read operation, the read/write circuit 320 may operate as the sense amplifier to read data from the cell array. During a program operation, the read/write circuit 320 may operate as the write driver that drives bit lines according to data to be stored in the cell array. The read/write circuit 320 may receive data to be written to the cell array from a buffer (not illustrated) during the program operation, and drive the bit lines according to the received data. To this end, the read/write circuit 320 may include a plurality of page buffers (PB) 322, 324 and 326 respectively corresponding to columns (or bit lines) or column pairs (or bit line pairs). Each of the page buffers 322, 324 and 326 may include a plurality of latches (not illustrated).

The memory device 150 may be implemented as a 2D or 3D memory device. Particularly, as illustrated in FIG. 4, the memory device 150 may be implemented as a nonvolatile memory device having a 3D stack structure. When the memory device 150 is implemented as a 3D structure, the memory device 150 may include a plurality of memory blocks BLK0 to BLKN−1. Herein, FIG. 4 is a block diagram illustrating the memory blocks 152, 154, 156 and 240 of the memory device 150 illustrated in FIG. 1. Each of the memory blocks 152, 154, 156 and 240 may be realized in a 3D structure (or vertical structure). For example, each of the memory blocks 152, 154, 156 and 240 may be realized in a 3D structure by including structures that are extended in first to third directions, e.g., an x-axis direction, a y-axis direction and a z-axis direction.

Each cell array 330 included in the memory device 150 may include a plurality of NAND strings NS that are extended in the second direction, and a plurality of NAND strings NS may be provided in the first direction and the third direction. Herein, each of the NAND strings NS may be coupled to a bit line BL, at least one string selection line SSL, at least one ground selection line GSL, a plurality of word lines WL, at least one dummy word line DWL and a common source line CSL, and include a plurality of transistor structures TS.

Each cell array 330 in the memory blocks 152, 154, 156 and 240 of the memory device 150 may be coupled to a plurality of bit lines BL, a plurality of string selection lines SSL, a plurality of ground selection lines GSL, a plurality of word lines WL, a plurality of dummy word lines DWL and a plurality of common source lines CSL, and thus, each cell array 330 may include the plurality of NAND strings NS. Also, in each cell array 330, one bit line BL may be coupled to the plurality of NAND strings NS to realize a plurality of transistors in one NAND string NS. A string selection transistor SST of each NAND string NS may be coupled to a corresponding bit line BL, and a ground selection transistor GST of each NAND string NS may be coupled to the common source line CSL. Herein, memory cells MC may be provided between the string selection transistor SST and the ground selection transistor GST of each NAND string NS. Namely, a plurality of memory cells may be realized in each cell array 330 in the memory blocks 152, 154, 156 and 240 of the memory device 150.

Figure 5:
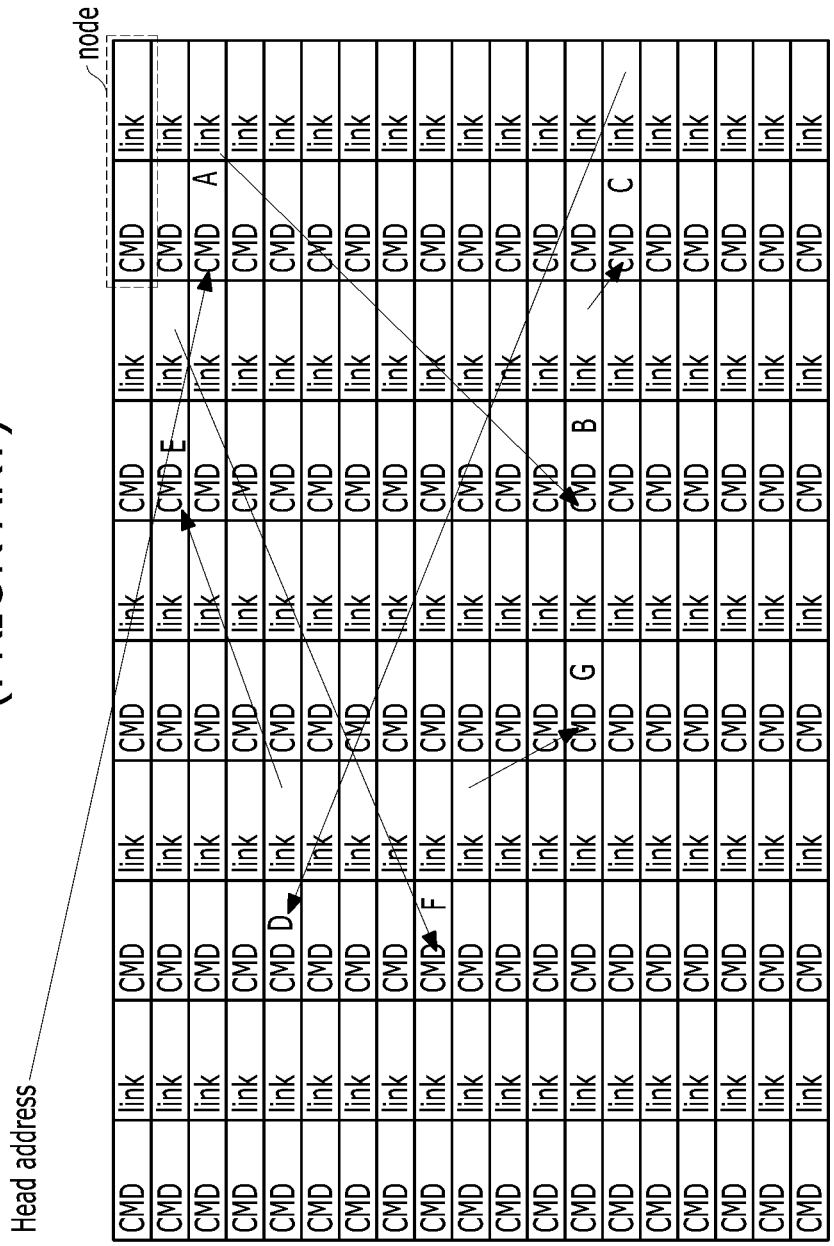
FIG. 5 is a diagram illustrating a command linked list according to a prior art.

FIG. 5 is a diagram illustrating a command linked list according to a prior art. Referring to FIG. 5, the linked list includes a plurality of commands, and links each having an address for a command to be executed next. A pair of one command and one link constitutes a node, and the linked list includes a plurality of nodes.

In FIG. 5, a command A (CMD A) constitutes a first node in the linked list, and the first node is a head node. A command to be executed after the command A is a command B (CMD B), and a link A, which is paired with the command A and constitutes the head node, indicates an address of the command B.

The command B is paired with a link B, and the link B indicates an address of a command C. In this way, a link C indicates a command D, a link D indicates a command E, a link E indicates a command F, and a link F indicates a command G.

As described above, since each node in the linked list includes a command and a link for a next command, the next command may be tracked and executed by the link. However, separate spaces for storing links have to be additionally allocated to the linked list. In FIG. 5, only links indicating commands to be executed next are illustrated, but when links indicating commands that have been executed previously are added, spaces for these links have to be additionally allocated to the linked list.

When the FTL unit 40 is changed due to updating, the address of each node may be changed. Accordingly, since the host 102 or the controller 130 has to conduct a search again starting from an address of a head node in order to track a command, and has to track a command through a link in order to access a previous command or a subsequent command, the host 102 or the controller 130 inevitably requires the time for tracking through the link.

In addition, since a command is tracked only through a link, the command and the link may be stored in a storage space in a complicated manner, not in the order of addresses of the storage space.

FIG. 6 is a diagram illustrating a circular queue 400, in accordance with an embodiment of the present disclosure. Referring to FIG. 6, predetermined areas of the memory 106 of the host 102 and the memory 144 of the controller 130 may be used as the circular queue 400. Each of the predetermined areas of the circular queue 400 may have the same size, and each of the areas may store a single item. The circular queue 400 may refer to a queue in which a head area is changed as the circular queue 400 becomes full of items. That is, the circular queue 400 may refer to a data structure in which a command area changes to a header area. In the circular queue 400, an item stored is deleted from a selected command area and a head is moved to the selected command area, which changes the selected command area to a head area and secures a space to store an additionally provided item, thereby continuously storing an additional item without moving items currently stored in other command areas. In this disclosure, an item can be a command or a response. The item can be a command when a circular queue is a command queue and can be a response when the circular queue is a response queue.

The circular queue 400 may include a head area, a tail area and a plurality of command areas. Although only the command areas in which commands are queued are illustrated in FIG. 6, the circular queue 400 may include a plurality of command response areas for storing responses to the commands.

Referring to FIG. 6, in the circular queue 400, an address of an upper left corner has the smallest value, and values of addresses increase in a rightward or downward direction. In another embodiment, in the circular queue 400, an address of a bottom right corner has the smallest value, and values of addresses may increase in a leftward or upward direction.

Each of the host 102 and the controller 130 may use memory areas each having the same size as the circular queue 400, and assign the same address to the circular queue 400 to check whether a command transmitted from the host 102 and a command received by the controller 130 coincide with each other through the respective circular queues 400 within the host 102 and the controller 130. That is, the host 102 and the controller 130 may each divide the memory space each having the same size into the same number of areas and may each queue the same command in the area having the same address.

The circular queue 400 may include a head area and a plurality of command areas, and the head area of the circular queue 400 may be empty without a command in order to indicate a location that the circular queue 400 starts. Commands may be sequentially enqueued into the command areas, starting from a command area subsequent to the head area. According to another embodiment, responses to commands may be queued in the circular queue 400. Hereinafter, the present disclosure is described based on commands, but the present disclosure is described as an example based on not only commands but also command responses are queued in the circular queue 400 even when the commands are queued therein.

An address of one command area may have a predetermined size. Therefore, an address of a command area increases by an amount of the predetermined size, and an address of a command area located from the head area by an amount of N number of N command areas has a value obtained by adding N×the size of the command area to an address of the head area.

The host 102 or the controller 130 may find the head area of the circular queue 400 by searching for an empty area within the circular queue 400 when the circular queue 400 is full of items. That is, when all command areas of the circular queue 400 are storing commands, only the head area of the circular queue 400 is empty, so the host 102 or the controller 130 may find the head area by searching for the empty area in the circular queue 400.

The host 102 or the controller 130 may designate a specific area as the head area when no commands are queued in the circular queue 400, and store an address of the designated head area.

When the circular queue 400 is not in a full state, the host 102 or the controller 130 may determine the head area by referring to a stored address of a head area or searching for an empty area and an address of an area next to the empty area. That is, when a command is included in the address of the area next to the empty area, the host 102 or the controller 130 may determine the empty area as the head area. An address of the head area may be determined using a location of the head area in the circular queue 400. In an embodiment, when an upper left command area has the address having the smallest value, the address of the head area located at an $N^{th}$ column and an $M^{th}$ row in the upper left command area may be calculated as follows.

Address of head area=address of upper left command area+size of command area×($N$−1)×(number of command areas per column)+size of command area×($M$−1)

When the address of the upper left command area is 100 and the size of the command area is 10, the head area of FIG. 6 is located at a $7^{th}$ column and a $10^{th}$ row. Therefore, the address of the head area is calculated as follows.

Address of head area=100+10×(7−1)×19+10×(10−1)

That is, the address of the head area becomes 1330.

The host 102 or the controller 130 may designate an area having an address next to a last command area as the tail area, add a command to the tail area, control the tail area to move to a next address whenever a command is added, and update an address of the tail area. That is, the tail area may refer to an area to which a new command is added.

According to an embodiment of the present disclosure, the host 102 or the controller 130 may search for an empty area among the command areas, starting from an address next to the head area, and add a command to the searched empty area.

Referring to FIG. 6, the current head area is located at the $7^{th}$ column and $10^{th}$ row, and the tail area is located at a $7^{th}$ column and a $7^{th}$ row. The host 102 or the controller 130 may add a command to the area of the $7^{th}$ column and $7^{th}$ row where a tail is located, move the tail area so that the tail area becomes an area of the $7^{th}$ column and an $8^{th}$ row, and update the address of the existing tail area to an address of the moved tail area.

Since there is no link including an address of a next command in the circular queue 400 according to an embodiment, there is no need to allocate a separate area for a link. According to an existing linked list method, when the circular queue 400 is full of items, it is necessary to track all nodes, search for a last node, insert a command into a new node, and connect the last node to the new node, in order to insert a new command. However, according to the circular queue 400 of the present disclosure, it is possible to easily search for the head area by searching for only an empty area, thereby rapidly inserting a new command.

In addition, even though the FTL unit 40 is changed, the address of the head area may be calculated immediately with no need to search for a separate address for the head area.

FIG. 7 is a diagram illustrating a method of searching for a command area in a circular queue full state, in accordance with an embodiment of the present disclosure.

FIG. 7 illustrates the circular queue as illustrated in FIG. 6. However, FIG. 7 illustrates the circular queue full of commands. Since FIG. 7 uses the same address system as that used in FIG. 6, an upper left address may have the smallest value, and values of addresses may increase in a rightward or downward direction.

Referring to FIG. 7, a current head area is located at an $8^{th}$ column and a $10^{th}$ row, a command A is located at a $9^{th}$ column and a $5^{th}$ row, and a command D is located at a $4^{th}$ column and a $12^{th}$ row.

Addresses of the commands A and D may be calculated using the equations described in FIG. 6. That is, the address of the command A is $100+10\times(9-1)\times19+10\times(5-1)=1660$, and the address of the command D is $100+10\times(4-1)\times19+(12-1)\times10=780$.

A command that comes 5 ahead of the command A is a command B, and an address of the command B is equal to the sum of the above-described address of the command A and a value obtained by multiplying a distance between the command A and the command B by the size of the command area.

That is, the address of the command B is $1660+5*10=1710$, and the same value may be obtained even using the equation in FIG. 6. Since the command B is located at the $9^{th}$ column and $10^{th}$ row, the address of the command B is $100+10\times(9-1)\times19+10\times(10-1)=1710$. Accordingly, it may be seen that the two values are the same.

A command C is the command that comes 8 behind of the command A, and is located at an $8^{th}$ column and a $16^{th}$ row. Therefore, an address of the command C is $1660-10\times8=1580$. This value may also be obtained using the equation in FIG. 6, and it may be seen that the address of command C is $100+10\times(8-1)\times19+10\times(16-1)=1580$, which is the same as the value obtained earlier.

Addresses of a command E and a command F may be obtained in the same manner. The command E is the command that comes 12 ahead of the command D, the command F is the command that comes 15 behind the command D. Therefore, the address of the command E is $780+12\times10=900$, and the command E is located at a $5^{th}$ column and a $5^{th}$ row. Therefore, the address of the command E is $100+10\times(5-1)\times19+10\times(5-1)=900$, which coincides with the value obtained earlier.

Since the command F is the command that comes 15 behind the command D, the address of the command F is $780-15\times10=630$. Since the command F is located at a $3^{rd}$ column and a $16^{th}$ row, the address of the command F is $100+10\times(3-1)\times19+10\times(16-1)=630$, which coincides with the value obtained earlier.

Therefore, when a circular queue according to an embodiment is used, there is no need to use a link in order to search for an address of a command, and the host 102 or the controller 130 may immediately calculate addresses of commands that come N ahead and behind of a current command.

Figure 8A:
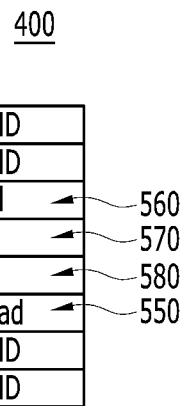
FIGS. 8A and 8B are diagrams illustrating an operation of inserting a command into a circular queue, in accordance with an embodiment of the present disclosure.
Figure 8B:
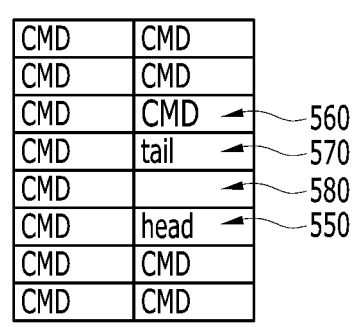

FIGS. 8A and 8B are diagrams illustrating an operation of inserting a command into a circular queue, in accordance with an embodiment of the present disclosure, and represent a portion of the circular queue 400 of FIGS. 6 and 7.

The host 102 or the controller 130 may insert a command into a tail area 560, and as the command is inserted into the tail area, the host 102 or the controller 130 may control a tail to move to a command area having a next address.

Referring to FIGS. 8A and 8B, two command areas 570 and 580 are present after the tail area 560, and a head area 550 is located after the two command areas 570 and 580. The host 102 or the controller 130 may queue a command in the command area 560 indicated by the tail, control the tail to move to the command area 570 having an address next to the command area 560 in which the command is queued, and update an address of the tail area.

According to an embodiment of the present disclosure, a tail area may not be present at the end of a command of the circulation queue 400. That is, the host 102 or the controller 130 may search for the head area 550 by using the stored address of the head area 550, search for an area with no command after the head area 550, and then insert a command into the first searched area 560 with no command.

Figure 9A:
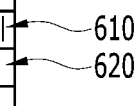
FIGS. 9A and 9B are diagrams illustrating an operation of inserting a command when a circular queue is full of items, in accordance with an embodiment of the present disclosure.
Figure 9B:
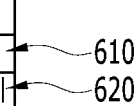

FIGS. 9A and 9B are diagrams illustrating an operation of inserting a command when a circular queue is full of items, in accordance with an embodiment of the present disclosure, and represent a portion of the circular queue 400 of FIGS. 6 and 7.

When the circular queue 400 becomes full of items, areas indicated by a head and a tail become the same, and the circular queue 400 becomes a state in which there is no area into which a command can be inserted. Referring to FIG. 9A, the current head and tail indicate the same area 610, and a command is queued in a command area 620 having a next address.

In order to insert a new command in a state in which the circular queue 400 is full of items, the host 102 or the controller 130 may remove a command queued in a command area next to the area indicated by the head and the tail, and insert the new commands into the command area from which the command is removed.

Referring to FIGS. 9A and 9B, the host 102 or the controller 130 may delete the command queued in the command area 620 having an address next to the area indicated by the head and the tail, then designate as a head area and a tail area, the command area from which the command is deleted, and insert a new command into the previous area 610.

According to an embodiment of the present disclosure, the host 102 or the controller 130 may insert a new command into the circular queue 400, which is full of commands, by using only the head without using the tail. Taking the case of FIGS. 9A and 9B as examples, the host 102 or the controller 130 may delete the command queued in the command area 620 having the next address of an area indicated by the head, then designate as the head area, the command area from which the command is deleted, queue a new command into the previous area 610, and update an address of the head area when the head area moves to a next address.

Figure 10:
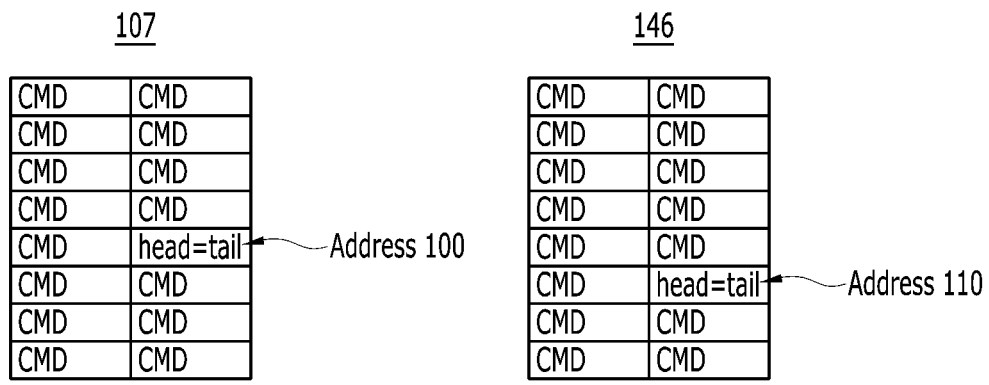
FIG. 10 is a diagram illustrating an operation of comparing head addresses between circular queues, in accordance with an embodiment of the present disclosure.

FIG. 10 is a diagram illustrating an operation of comparing head addresses between circular queues, in accordance with an embodiment of the present disclosure.

Before transmitting a command to the controller 130, the host 102 may check whether an address of a head area of the command transmission circular queue 107 coincides with an address of a head area of the command reception circular queue 146. The addresses of the head areas of the command transmission circular queue 107 and the command reception circular queue 146 may be different from each other for various reasons. For example, the controller 130 may queue more commands than the host 102, or the controller 130 may fail to queue the command transmitted by the host 102.

When the head addresses of the head areas of the command transmission circular queue 107 and the command reception circular queue 146 are different from each other before the host 102 transmits a new command to the controller 130, it is difficult to track a precedence relationship between commands even though the new command is queued. Therefore, the host 102 may process, as failure, the new command to be transmitted to the controller 130, and reset the command transmission circular queue 107, and the controller 130 may reset the command reception circular queue 146. Consequently, the host 102 and the controller 130 may create the circular queues without commands.

Referring to FIG. 10, the command transmission circular queue 107 is full of items, and the command reception circular queue 146 is also full of items.

Before transmitting the new command to the controller 130, the host 102 may check that the address of the head area of the command transmission circular queue 107 is 100. In addition, the host 102 may request the address of the head area of the command reception circular queue 146 from the controller 130. The controller 130 may check the address of the head area of the command reception circular queue 146 and transmit the address 110 of the head area of the command reception circular queue 146 to the host 102, and the host 102 may determine that the address 100 of the head area of the command transmission circular queue 107 is different from the address 110 of the head area of the command reception circular queue 146.

In this case, the host 102 may process, as failure, the new command to be transmitted to the controller 130, reset the command transmission circular queue 107, and transmit a command reception circular queue reset command to the controller 130.

Comparison of addresses between the head areas may be performed not only by the host 102 but also by the controller 130. In this case, the controller 130 may request the address 100 of the head area from the host 102, compare the address 100 of the head area of the host 102 with the address 110 of the head area of the controller 130, and notify the host 102 that the addresses of the two head areas are different from each other, and accordingly, the host 102 may reset the command transmission circular queue 107, and transmit the command reception circular queue reset command to the controller 130.

In an embodiment, it is compared whether the address of the head area of the command transmission circular queue 107 coincides with the address of the head area of the command reception circular queue 146. However, the present disclosure is not limited thereto, and the above-described method is also applicable to the command response transmission circular queue 145 and the command response reception circular queue 108. According to the present disclosure, no matter when the circular queues are full of items or not, the addresses between the head areas may be compared with each other, and the addresses may be reset when the addresses are different from each other.

Figure 11:
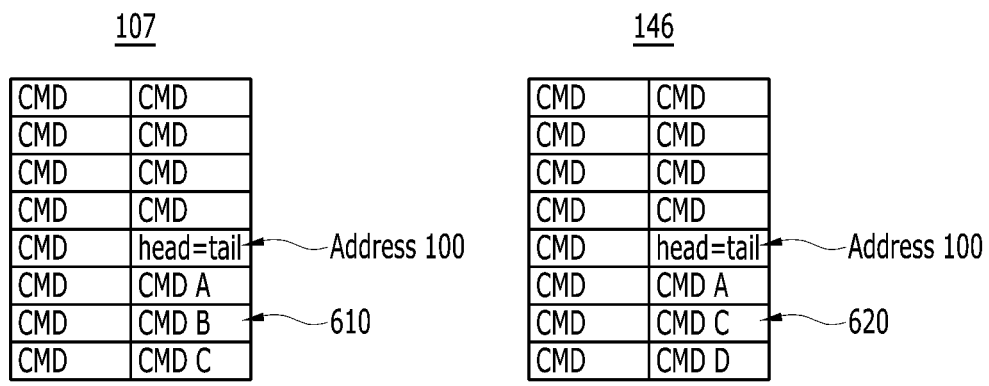
FIG. 11 is a diagram illustrating an operation of comparing commands between a command transmission circular queue and a command reception circular queue, in accordance with an embodiment of the present disclosure.

FIG. 11 is a diagram illustrating an operation of comparing commands between the command transmission circular queue 107 and the command reception circular queue 146, in accordance with an embodiment of the present disclosure. When the comparison result of FIG. 10 indicates that the addresses of the head areas between the command transmission circular queue 107 and the command reception circular queue 146 coincide with each other, the host 102 and the controller 130 may compare the commands between the circular queues.

That is, before transmitting the command to the controller 130, the host 102 may check whether the command of the command transmission circular queue 107 coincides with the command of the command reception circular queue 146. The commands of the command transmission circular queue 107 and the command reception circular queue 146 may be different for various reasons. For example, the controller 130 may omit the command.

When the commands between the circular queues are different from each other before the host 102 transmits a new command to the controller 130, it may indicate that a specific command is not queued. Even though the new command is queued, it is difficult to track a precedence relationship between the commands. Therefore, the host 102 may process, as failure, the new command, and reset the command transmission circular queue 107, and the controller 130 may reset the command reception circular queue 146. Consequently, the host 102 and the controller 130 may create the circular queues without commands.

Referring to FIG. 11, the command transmission circular queue 107 is full of items, and the command reception circular queue 146 is also full of items.

Before transmitting the new command to the controller 130, the host 102 may check that the address of the head area of the command transmission circular queue 107 is 100. In addition, the host 102 may request the address of the head area of the command reception circular queue 146 from the controller 130. The controller 130 may check the address of the head area of the command reception circular queue 146 and transmit the address 100 of the head area of the command reception circular queue 146 to the host 102, and the host 102 may determine that the address 100 of the head area of the command transmission circular queue 107 coincides with the address 100 of the head area of the command reception circular queue 146.

Since the head addresses coincide with each other, the host 102 may check whether the commands between the circular queues coincide with each other. The host 102 may sequentially request commands queued in command areas after the address of the head area from the controller 130. The host 102 may request a command queued in a command area having an address next to the address of the head area, and the controller 130 may transmit a command A to the host 102. Since the command transmitted by the controller 130 is also the command A, the host 102 may request a command queued in a command area having an address next to the command A.

The controller 130 may transmit a command C 620, queued in the command area having the address next to the command A, to the host 102. In this case, since the command queued in the command area having the address next to the command A is a command B 610 in the command transmission circular queue 107 of the host 102, the host 102 may determine that the commands do not coincide with each other.

Accordingly, the host 102 may process, as failure, the new command to be transmitted to the controller 130, reset the command transmission circular queue 107, and transmit a command reception circular queue reset command to the controller 130.

In an embodiment of the present disclosure, comparison between commands may be performed not only by the host 102 but also by the controller 130. In this case, the controller 130 may request a command for the comparison from the host 102. When the commands do not coincide with each other as a result of comparison, the controller 130 may notify the host 102 that the commands do not coincide with each other, and when all the commands coincide with each other, the controller 130 may notify the host 102 that the commands coincide with each other. When the controller notifies the host 102 that the commands do not coincide with each other, the host 102 may process, as failure, the new command to be transmitted to the controller 130, reset the command transmission circular queue 107, and transmit a command reception circular queue reset command to the controller 130.

Although not illustrated in the drawing, even when the command transmission circular queue 107 and the command reception circular queue 146 are not full of items, the host 102 or the controller 130 may determine whether the commands coincide with each other. That is, when a tail area is present, the host 102 or the controller 130 may compare an address of the tail area of the command transmission circular queue 107 with an address of the tail area of the command reception circular queue 146. When the addresses are different from each other, the host 102 or the controller 130 may determine that a command has been omitted due to an error that occurred during command transmission and reception.

When a tail area is not present, the host 102 or the controller 130 may sequentially compare commands from a command area next to a head area by using the stored address of the head area. When the commands do not coincide with each other, it may be confirmed that the commands do not coincide with each other because a command has been omitted or an error has occurred during transmission or reception of a command.

In an embodiment, it is compared whether the command of the command transmission circular queue 107 coincides with the command of the command reception circular queue 146, but the present disclosure is not limited thereto, and the above-described method is also applicable to the command response transmission circular queue 145 and the command response reception circular queue 108.

Figure 12:
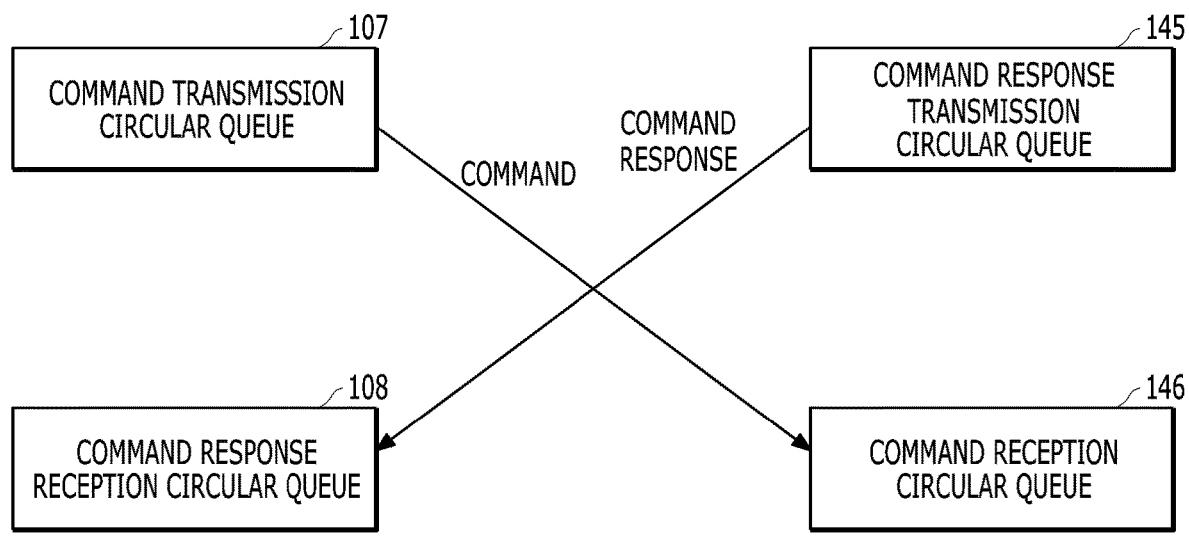
FIG. 12 is a diagram illustrating correspondence between circular queues, in accordance with an embodiment of the present disclosure.

FIG. 12 is a diagram illustrating structures of circular queues, in accordance with an embodiment of the present disclosure. Referring to FIG. 12, as illustrated in FIG. 1, the host 102 may include the command transmission circular queue 107 and the command response reception circular queue 108, and the controller 130 may include the command response transmission circular queue 145 and the command reception circular queue 146. The command transmission circular queue 107 of the host 102 may correspond to the command reception circular queue 146 of the controller 130, and the command response transmission circular queue 145 of the controller 130 may correspond to the command response reception circular queue 108 of the host 102.

For example, the command transmission circular queue 107 may store a command transmitted to the controller 130, and the command reception circular queue 146 may store a command received from the host 102. When the command transmission circular queue 107 and the command reception circular queue 146, which are circular queues each having the same address structure having the same size, transmit or receive commands, the host 102 and the controller 130 may insert the commands, which are transmitted or received, to the same address. Namely, the host 102 and the controller 130 may check whether the commands are accurately transmitted or received, by inserting the same command to the same address of the same circular queue.

For example, when a command is present in the command transmission circular queue 107, but a command is not present in the command reception circular queue 146, or when a command stored in the command reception circular queue 146 is different from a command stored in the command transmission circular queue 107, a command in which an error occurs and commands ahead and behind of the command may be analyzed so that a cause of the error occurrence may be analyzed.

The case where addresses of head areas are different from each other also indicates that an error occurs during the transmission or reception of commands. Therefore, a command to be transmitted afterwards may be processed as failure, and each of the circular queues may be reset.

Figure 13:
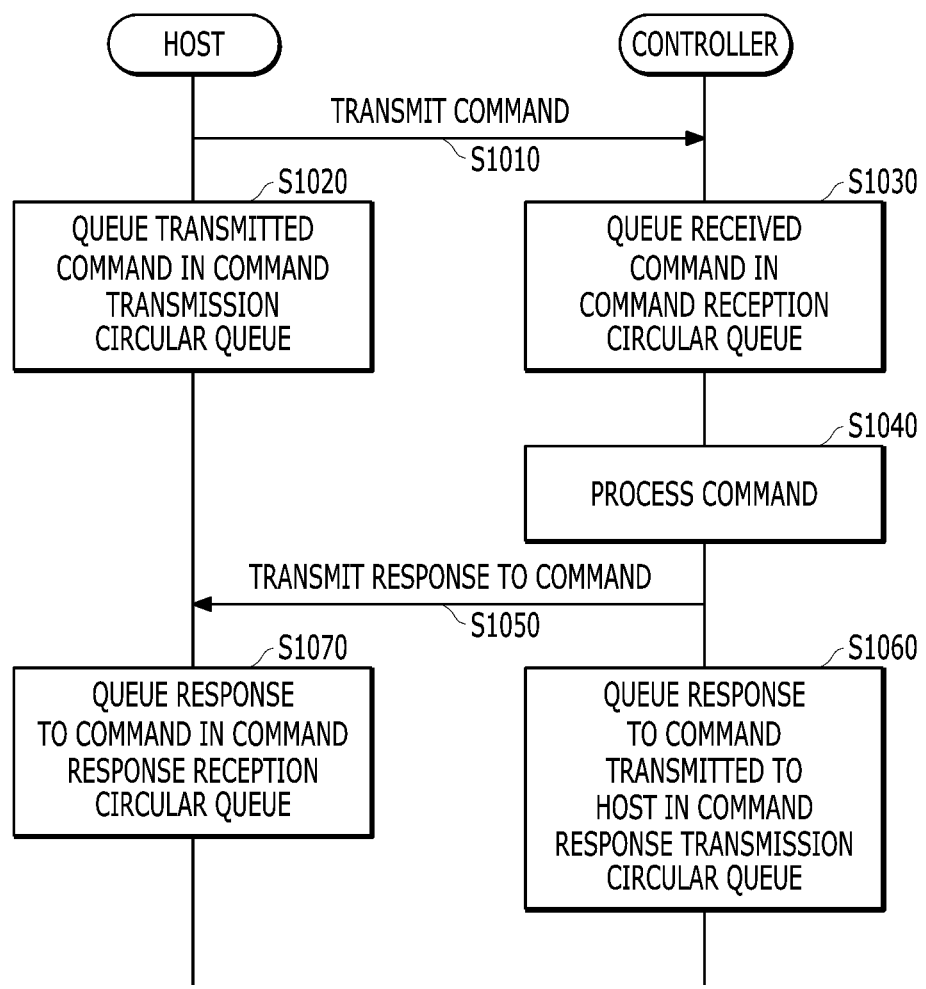
FIG. 13 is a flowchart illustrating a method of transmitting and storing a command by using a circular queue, in accordance with an embodiment of the present disclosure.

FIG. 13 is a flowchart illustrating a method of transmitting and storing a command by using a circular queue, in accordance with an embodiment of the present disclosure.

Referring to FIG. 13, the host 102 may transmit a command to the controller 130 in operation S1010.

In operation S1020, the host 102 may queue the command, which is transmitted to the controller 130, in the command transmission circular queue 107. In operation S1030, the controller 130 may queue, within the command reception circular queue 146, the received command in a command area having the same address as a command area queueing the command within the command transmission circular queue 107.

The controller 130 may process the command queued in the command reception circular queue 146, in operation S1040, and then transmit a response to the processed command to the host 102 in operation S1050.

In operation S1060, the controller 130 may queue the response, which is transmitted to the host 102, in the command response transmission circular queue 145. In operation S1070, the host 102 may queue, within the command response reception circular queue 108, the received response to the command in an area having the same address as an area queueing the response within the command response transmission circular queue 145.

Figure 14:
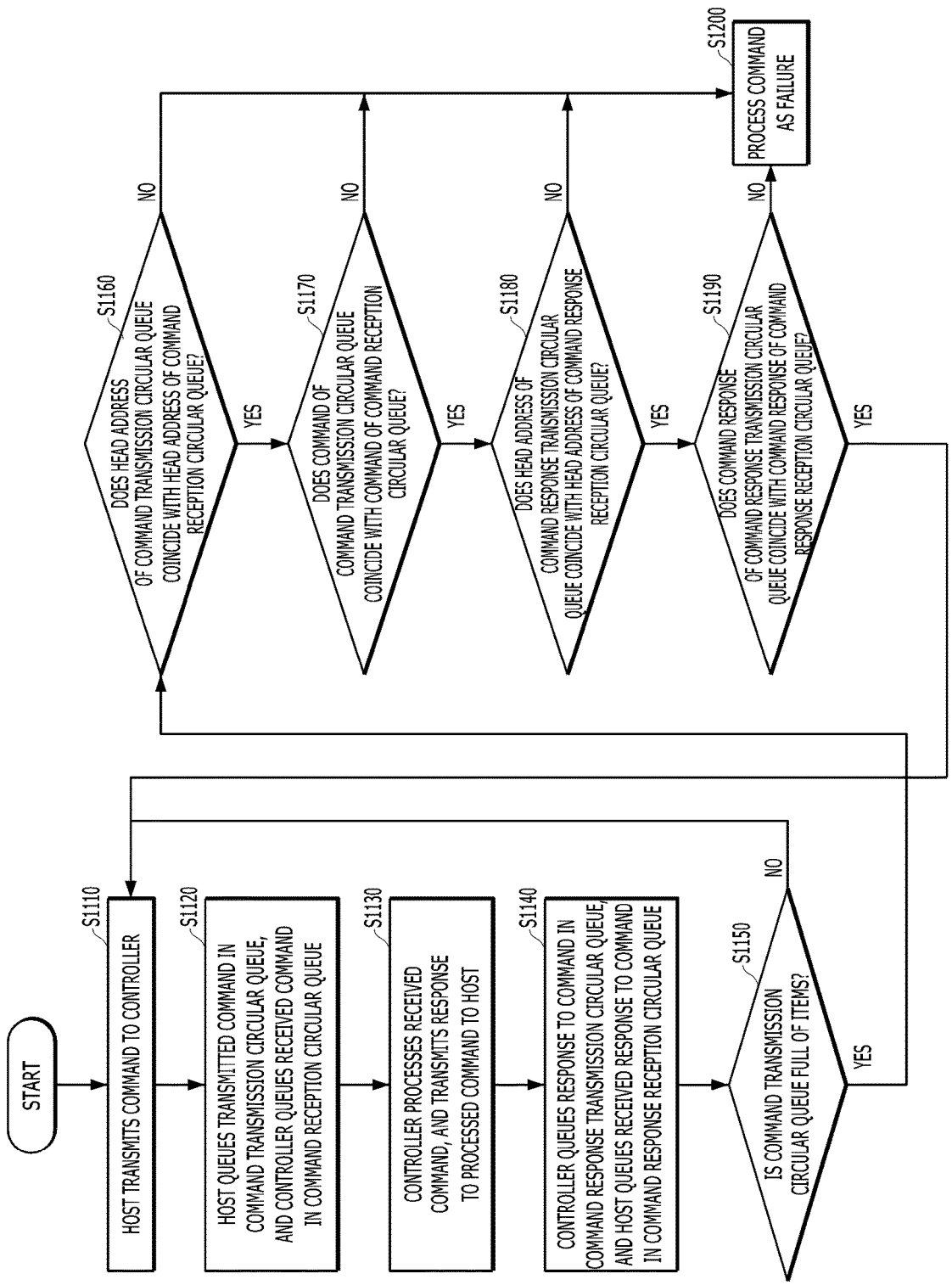
FIG. 14 is a flowchart illustrating an operation of a circular queue, in accordance with an embodiment of the present disclosure.

FIG. 14 is a flowchart illustrating an operation of a circular queue, in accordance with an embodiment of the present disclosure. Referring to FIG. 14, the host 102 may transmit a command to the controller 130 in operation S1110. In operation S1120, the host 102 may queue the command, which is transmitted to the controller 130, in the command transmission circular queue 107, and the controller 130 may queue the command received from the host 102 in a command area of the command reception circular queue 146 having the same address as the command transmission circular queue 107.

In operation S1130, the controller 130 may transmit a response to the command to the host 102 after executing the command received from the host 102. In operation S1140, the controller 130 may queue the response to the command, which is transmitted to the host 102, in the command response transmission circular queue 145, and the host 102 may queue the received response to the command in a command response area of the command response reception circular queue 108 having the same address as the command response transmission circular queue 145.

In operation S1150, the host 102 may determine whether the command transmission circular queue 107 is full of items. When the command transmission circular queue 107 is not full of items (that is, "NO" in operation S1150), the host 102 may return to operation S1110, and continue to transmit a command to the controller 130.

When the command transmission circular queue 107 is full of items (that is, "YES" in operation S1150), the controller 130 may determine whether an address of the head area of the command transmission circular queue 107 coincides with an address of the head area of the command reception circular queue 146 of the controller 130. In this case, the controller 130 may request the address of the head area from the host 102, and receive the address of the head area.

When the addresses of the two head areas do not coincide with each other (that is, "NO" in operation S1160), the circular queues 107 and 146 may not additionally queue a command due to the discrepancy therebetween. Accordingly, in operation S1200, the controller 130 may notify the host 102 of the discrepancy occurrence, and the host 102 may designate, as failure, a new command to be transmitted to the controller 130.

When the addresses of the two head areas coincide with each other (that is, "YES" in operation S1160), the controller 130 may compare the command queued in the command transmission circular queue 107 with a command queued in the command reception circular queue 146 of the controller 130, in operation S1170. The controller 130 may receive the command from the command transmission circular queue 107 of the host 102, the received command being a target for the comparison of operation S1170.

When a result of the comparison between the commands indicates that at least one command does not coincide with another one (that is, "NO" in operation S1170), the controller 130 may notify the host 102 of the discrepancy, and the host 102 may designate, as failure, the new command to be transmitted to the controller 130, in operation S1200. When a result of the comparison between the commands indicates that there is no command that does not coincide with another one (that is, "YES" in operation S1170), the controller 130 may compare an address of the head area of the command response transmission circular queue 145 of the controller 130 with an address of the head area of the command response reception circular queue 108 of the host 102, in operation S1180. When a result of the comparison indicates that the address of the head area of the command response transmission circular queue 145 does not coincide with the address of the head area of the command response reception circular queue 108 (that is, "NO" in operation S1180), the controller 130 may notify the host 102 of the discrepancy, and the host 102 may designate, as failure, the new command to be transmitted to the controller 130, in operation S1200. When a result of the comparison indicates that the address of the head area of the command response transmission circular queue 145 coincides with the address of the head area of the command response reception circular queue 108 (that is, "YES" in operation S1180), the controller 130 may compare a command response queued in the command response transmission circular queue 145 of the controller 130 with a command response queued in the command response reception circular queue 108 of the host 102, in operation S1190. At this time, the controller 130 may receive the command response from the command response reception circular queue 108 of the host 102, the command response being a target for the comparison of operation S1190.

When a result of the comparison between the command responses indicates that at least one command response does not coincide with another command response (that is, "NO" in operation S1190), the controller 130 may notify the host 102 of the discrepancy, and the host 102 may designate, as failure, the new command to be transmitted to the controller 130, in operation S1200. When a result of the comparison between the command responses indicates that there is no command response that does not coincide with another one (that is, "YES" in operation S1190), the controller 130 may notify the host 102 that all of the commands and the command responses between the head addresses and the circular queues coincide. Subsequently, the host 102 returns to operation S1110, and transmits a new command to the controller 130. In an embodiment, it has been described that the controller 130 compares head addresses, commands and command responses between the circular queues, but the embodiments of the present disclosure are not limited thereto, and the host 102 may compare head addresses, commands and command responses between the circular queues, and the host 102 and the controller 130 may divide up the comparison operation.

According to embodiments of the present disclosure, it is possible to provide a memory system, in which a host and a controller can store a command and a response to the command by using the same circular queue, and determine whether the command is abnormal, and an operating method of the memory system.

Also, according to embodiments of the present disclosure, it is possible to provide a memory system, in which a host and a controller can easily track a command by using the same circular queue and reduce memory usage, and an operating method of the memory system.

Although a memory system and an operating method thereof in accordance with embodiments of the present disclosure have been described as specific embodiments, these are merely examples, and the present disclosure is not limited thereto and should be construed as having the widest range based on the basic idea disclosed in the present specification. Those skilled in the art may carry out unspecified embodiments by combining and replacing the disclosed embodiments, without departing from the scope of the present disclosure. In addition, those skilled in the art may easily change or modify the disclosed embodiments based on the present specification, and it is apparent that such changes or modifications also fall within the scope of the present disclosure and the following claims. Furthermore, the embodiments may be combined to form additional embodiments.

What is claimed is:

1. A memory system comprising:
a memory device; and
a controller including:
an internal reception queue configured to queue a command queued in an external transmission queue of a host, the command being provided to the controller from the host; and
an internal transmission queue suitable for queueing a response to the command, the response being transmitted from the controller to the host and to be queued in an external reception queue of the host,
wherein the controller is configured to control the memory device based on the command to generate the response,
wherein the controller is further configured to:
compare, addresses of a head area each included in the external transmission queue and the internal reception queue,
compare, when the addresses of the head areas coincide with each other in the external transmission queue and the internal reception queue, commands queued in a command area each included in the external transmission queue and the internal reception queue, and reset each of the internal transmission queue and the external reception queue, when the commands queued in the command areas do not coincide with each other in the external transmission queue and the internal reception queue or the addresses of a head areas do not coincide with each other in the external transmission queue and the internal reception queue.

2. The memory system of claim 1,
wherein each of the external transmission queue and the internal reception queue includes the head area and one or more command areas, and
wherein each of the external reception queue and the internal transmission queue includes the head area and one or more command response areas.

3. The memory system of claim 2, wherein the controller is further configured to queue, in the internal reception queue, the command in a command area having the same address as a command area queueing the command in the external transmission queue.

4. The memory system of claim 2,
wherein numbers of the command areas are the same in the external transmission queue and the internal reception queue and numbers of the command response areas are the same in the internal transmission queue and the external reception queue, and
wherein an address increases in the same direction in the external transmission queue and the internal reception queue and an address increases in the same direction in the internal transmission queue and the external reception queue.

5. The memory system of claim 2, wherein the controller is further configured to compare, when the external transmission queue is full of commands, addresses of the head areas in the external transmission queue and the internal reception queue.

6. The memory system of claim 2, wherein the controller is further configured to:
determine an empty area as the head area within the internal reception queue when the internal reception queue is full of commands, and
determine an empty area as the head area within the internal transmission queue when the internal transmission queue is full of responses.

7. The memory system of claim 6, wherein the controller is further configured to:
delete a command from a command area next to the head area within the internal reception queue to determine, as the head area, the command area next to the head area within the internal reception queue when the internal reception queue is full of commands, and
delete a command response from a command response area next to the head area within the internal transmission queue to determine, as the head area, the command response area next to the head area within the internal transmission queue when the internal transmission queue is full of responses.

8. The memory system of claim 2, wherein an address of a second command area separated from a first command area by an amount of N number of command areas is determined based on an address of the first command area and by multiplying a size of the command area by N.

9. The memory system of claim 5, wherein the controller is further configured to:
compare, when the commands queued in the command areas coincide with each other in the external transmission queue and the internal reception queue, addresses of the head areas in the internal transmission queue and the external reception queue.

10. The memory system of claim 9, wherein the controller is further configured to compare, when the addresses of the head areas coincide with each other in the internal transmission queue and the external reception queue, the command responses queued in the command response areas between the internal transmission queue and the external reception queue.

11. An operating method of a memory system, the operating method comprising:
receiving a command queued in an external transmission queue of a host, the command being provided to the memory system from the host;
queueing the command in an internal reception queue;
transmitting a response to the command to the host, the response to be queued in an external reception queue of the host;
queueing the response to the command in an internal transmission queue;
comparing, addresses of a head area each included in the external transmission queue and the internal reception queue;
comparing, in response to the addresses of the head areas coinciding with each other in the external transmission queue and the internal reception queue, commands queued in a command area each included in the external transmission queue and the internal reception queue, and
resetting each of the internal transmission queue and the external reception queue, in response to the commands queued in the command areas not coinciding with each other in the external transmission queue and the internal reception queue or addresses of a head area not coinciding with each other in the external transmission queue and the internal reception queue.

12. The operating method of claim 11,
wherein each of the external transmission queue and the internal reception queue includes the head area and one or more command areas, and
wherein each of the external reception queue and the internal transmission queue includes the head area and one or more command response areas.

13. The operating method of claim 12, further comprising queueing, in the internal reception queue, the command in a command area having a same address as a command area queueing the command in the external transmission queue.

14. The operating method of claim 12,
wherein numbers of the command areas are the same in the external transmission queue and the internal reception queue and numbers of the command response areas are the same in the internal transmission queue and the external reception queue, and
wherein an address increases in the same direction in the external transmission queue and the internal reception queue and an address increases in the same direction in the internal transmission queue and the external reception queue.

15. The operating method of claim 12, further comprising comparing, when the external transmission queue is full of commands, addresses of the head areas in the external transmission queue and the internal reception queue.

16. The operating method of claim 12, further comprising:
determining an empty area as the head area within the internal reception queue when the internal reception queue is full of commands, and determining an empty area as the head area within the internal transmission queue when the internal transmission queue is full of responses.

17. The operating method of claim 16, further comprising:

deleting a command from a command area next to the head area within the internal reception queue to determine, as the head area, the command area next to the head area within the internal reception queue when the internal reception queue is full of commands, and deleting a command response from a command response area next to the head area within the internal transmission queue to determine, as the head area, the command response area next to the head area within the internal transmission queue when the internal transmission queue is full of responses.

18. The operating method of claim 12, wherein an address of a second command area separated from a first command area by an amount of N number of command areas is determined based on an address of the first command area and by multiplying a size of the command area by N.

19. The operating method of claim 15, further comprising:

comparing, when the commands queued in the command areas coincide with each other in the external transmission queue and the internal reception queue, addresses of the head areas in the internal transmission queue and the external reception queue.

20. The operating method of claim 19, further comprising comparing, when the addresses of the head areas coincide with each other in the internal transmission queue and the external reception queue, the command responses queued in the command response areas in the internal transmission queue and the external reception queue.

* * * * *